(12) United States Patent
Scarfone et al.

(10) Patent No.: US 10,698,580 B2
(45) Date of Patent: Jun. 30, 2020

(54) METHOD FOR GRAPHICALLY MANAGING A PITCH SCALE IN AN ON-BOARD VIEWING SYSTEM FOR AN AIRCRAFT

(71) Applicant: THALES, Courbevoie (FR)

(72) Inventors: Frédéric Scarfone, Merignac (FR); Patrice Malot, Merignac (FR); Bruno Aymeric, Merignac (FR); Jonathan Barreau, Bordeaux (FR)

(73) Assignee: THALES, Courbevoie (FR)

( * ) Notice: Subject to any disclaimer, the term of this patent is extended or adjusted under 35 U.S.C. 154(b) by 142 days.

(21) Appl. No.: 15/832,619

(22) Filed: Dec. 5, 2017

(65) Prior Publication Data

US 2018/0173387 A1 Jun. 21, 2018

(30) Foreign Application Priority Data

Dec. 20, 2016 (FR) ...................... 16 01803

(51) Int. Cl.
| | | |
|---|---|---|
| *G06F 3/0484* | (2013.01) | |
| *B64D 43/00* | (2006.01) | |
| *G06F 3/0481* | (2013.01) | |
| *G01C 23/00* | (2006.01) | |

(52) U.S. Cl.
CPC .......... *G06F 3/0484* (2013.01); *B64D 43/00* (2013.01); *G01C 23/005* (2013.01); *G06F 3/04817* (2013.01)

(58) Field of Classification Search
CPC ........ B64D 43/00; B64D 43/02; B64D 45/00; G01C 23/00; G01C 23/005; G05D 1/101; G05D 1/08; G05D 1/0808; G06T 19/003; G06T 2219/2004; G06T 2219/2016; G08G 5/02; G09G 2380/12; G06F 40/166; G06F 3/0484
See application file for complete search history.

(56) References Cited

U.S. PATENT DOCUMENTS

| | | | |
|---|---|---|---|
| 4,786,905 A | 11/1988 | Muller | |
| 5,185,606 A * | 2/1993 | Verbaarschot | G01C 23/00 340/961 |
| 10,235,777 B2 * | 3/2019 | Descheemaeker | B64D 43/02 |
| 2003/0193411 A1 | 10/2003 | Price | |

(Continued)

FOREIGN PATENT DOCUMENTS

FR 3052553 A1 * 12/2017 ............. G01C 23/00

*Primary Examiner* — Mohammed H Zuberi
*Assistant Examiner* — Carl E Barnes, Jr.
(74) *Attorney, Agent, or Firm* — Baker & Hostetler LLP

(57) ABSTRACT

Methods for graphically managing a pitch scale displayed in an on-board viewing system for an aircraft, the viewing system comprises a graphics computer carrying out the graphical management of the symbols and a viewing screen. The symbolic representation displayed on the viewing screen includes an angular pitch scale, a symbol, referred to as the aircraft icon, that is representative of the attitude of the aircraft and a symbol, referred to as the speed vector that is representative of the direction of the speed of the aircraft. The angular distance separating the "bars" of the scale varies so that the symbols representative of the attitude of the aircraft and of the speed vector remain constantly close to one of the two bars of the scale, even in the event of a strong crosswind. The shape of the bars is either constant or variable.

8 Claims, 2 Drawing Sheets

(56) References Cited

U.S. PATENT DOCUMENTS

| | | | | |
|---|---|---|---|---|
| 2003/0222887 A1* | 12/2003 | Wilkins, Jr. | ......... | G01C 23/005 |
| | | | | 345/618 |
| 2009/0207048 A1* | 8/2009 | He | ......... | G01C 23/00 |
| | | | | 340/973 |
| 2017/0358108 A1* | 12/2017 | Descheemaeker | ..... | B64D 43/02 |

* cited by examiner

METHOD FOR GRAPHICALLY MANAGING A PITCH SCALE IN AN ON-BOARD VIEWING SYSTEM FOR AN AIRCRAFT

CROSS-REFERENCE TO RELATED APPLICATIONS

This application claims priority to foreign French patent application No. FR 1601803, filed on Dec. 20, 2016, the disclosure of which is incorporated by reference in its entirety.

FIELD OF THE INVENTION

The field of the invention is that of viewing systems for an aircraft including means for displaying the necessary flight information.

BACKGROUND

A viewing system for an aircraft includes at least one inertial unit, sensors measuring altitude and speed, electronic calculation means and one or more viewing devices incorporated within the cockpit of the aircraft and displaying a symbolic representation of the main flight and navigation parameters. Generally, the synthetic image is displayed on the viewing screens that are located on the front of the instrument panel of the aircraft or in "head-up" viewing devices.

By way of example, FIG. 1 shows, in a stylized manner and with the inherent limitations of patent figures, an image of this type. The symbolic representation is represented by black lines. This primarily includes:
- "ADI" (attitude director indicator) parameters, which indicate the attitude of the aircraft, i.e. the angular position thereof in terms of roll and pitch. Conventionally, the position of the aircraft is represented by a symbol 1, called the aircraft icon, that is centred on a scale 2 graduated in degrees. This scale is referred to as the pitch scale. The symbol 1 is represented by a V, the wings of which include a horizontal bar. In FIG. 1, the scale 2 is represented by two series of symmetrical symbols 3 that are spaced apart by 5 degrees. The symbols 3 take the form of a square bracket. The ADI parameters also include a horizon bar 4;
- The air speed scale 5. This is a vertical scale located to the left of the attitude scale. It represents the speed of the aircraft and is generally graduated in knots. In FIG. 1, the air speed is 155 knots;
- The altitude scale 6. This is a vertical scale located to the right of the attitude scale. It is generally graduated in feet. In FIG. 1, the altitude of the aircraft is 1000 feet. This scale 6 is symmetrical with the speed scale 5 with respect to the ADI scale 2;
- The speed vector 7. This is generally represented by a circle including two symmetrical horizontal segments and one vertical segment. It represents the angular direction formed by the speed of the aircraft with the angular position of the aircraft.

There are two main flight modes, referred to as the heading-up mode and the track-up mode. In the case of an approach in heading-up mode, the pitch scale is centred on the aircraft icon. In the case of an approach in track-up mode, the pitch scale is centred on the speed vector.

The representation described above is perfectly suited to both modes as long as the aircraft icon and the speed vector remain relatively close to one another. Graphically speaking, this means that these two symbols remain within the pitch scale.

However, regardless of the flight mode, one of the two vectors will be isolated from the pitch scale because of a substantial drift of the aircraft due to a severe crosswind. In heading-up mode, the speed vector is isolated, due to a substantial drift, from any attitude reference. In the case of a go-around in track-up mode, the aircraft icon is isolated, due to a strong crosswind, in the flight view, without an accurate attitude reference, whereas this flight phase requires a determined attitude setpoint.

In order to solve this problem, multiple solutions have been proposed. The first solution consists in displaying, in addition to the speed vector, a reminder symbol positioned in the pitch scale that is representative of the pitch angle of the speed vector. This symbol consists, for example, of two symmetrical horizontal segments surmounted by a vertical segment. However, this symbol is not shown in a conformal position.

A second solution, when the symbolic representation is presented as superposed over a three-dimensional perspective view of the overflown terrain, consists in shifting the synthetic image, which is shown in a conformal position under normal conditions, so that the pitch scale remains centred on the viewing screen. The main drawback of these two solutions is that they display a symbolic representation or a representation of the exterior in a non-conformal position.

SUMMARY OF THE INVENTION

The method for graphically managing a pitch scale in an on-board viewing system for an aircraft according to the invention does not have these drawbacks. The symbols that represent the aircraft icon and the speed vector are always shown in a conformal position. Only the representation of the pitch scale varies. More specifically, the subject of the invention is a method for graphically managing a pitch scale displayed in an on-board viewing system for an aircraft, said viewing system including a graphics computer carrying out the graphical management of the symbols and a viewing screen, the symbolic representation displayed on said viewing screen including at least:
- an angular pitch scale, said scale being represented by a first series of first symbols and a second series of second symbols that is separated from the first series of symbols by a first angular distance in a horizontal direction;
- a third symbol, referred to as the aircraft icon, that is representative of the attitude of the aircraft;
- a fourth symbol, referred to as the speed vector, that is representative of the direction of the speed of the aircraft;

characterized in that the angular distance separating the first and the second series of symbols of the pitch scale is a function of the angular distance between the third and the fourth symbol.

Advantageously,
- the angular pitch scale being centred on the third symbol or the fourth symbol, when the angular distance in a horizontal plane separating the third symbol from the fourth symbol is smaller than or equal to a determined value, the first angular distance separating the first series of symbols from the second series of symbols is constant;
- the angular pitch scale being centred on the third symbol, when the angular distance in a horizontal plane separating the fourth symbol from the third symbol exceeds a determined value, the series of symbols closest to the fourth symbol is moved or modified in a horizontal plane so that the angular distance in a horizontal plane separating the fourth symbol from said moving series remains smaller than a second determined distance;

the angular pitch scale being centred on the fourth symbol, when the angular distance in a horizontal plane separating the fourth symbol from the third symbol exceeds a determined value, the series of symbols closest to the third symbol is moved or modified in a horizontal plane so that the angular distance in a horizontal plane separating the third symbol from said moving series remains smaller than said second determined distance.

Advantageously, the first symbols are identical to the second symbols regardless of the value of the angular distance separating the fourth symbol from the third symbol.

Advantageously, if the first symbols and the second symbols each include a horizontal straight segment, when a first symbol or a second symbol is moved from an initial position to a final position, a horizontal line links the initial position of the first symbol or of the second symbol to the final position of the first symbol or of the second symbol.

Advantageously, the horizontal line is continuous or discontinuous.

Advantageously, the first symbols are separated from one another by a third angular distance that is constant in a vertical direction, the second symbols being separated from one another by this same third angular distance that is constant in a vertical direction.

Advantageously, when the angular pitch scale is centred on the third symbol and when the angular distance in a horizontal plane separating the third symbol from the fourth symbol is smaller than or equal to the determined value, the third symbol is at an equal distance in a horizontal plane from the first series of first symbols and from the second series of second symbols.

Advantageously, when the angular pitch scale is centred on the fourth symbol and when the angular distance in a horizontal plane separating the third symbol from the fourth symbol is smaller than or equal to the determined value, the fourth symbol is at an equal distance in a horizontal plane from the first series of first symbols and from the second series of second symbols.

Advantageously, the fluctuations in the angular distance in a horizontal plane separating the fourth symbol from the third symbol are taken into account only when they exceed a determined threshold in a given period of time.

BRIEF DESCRIPTION OF THE DRAWINGS

The invention will be better understood and other advantages will become apparent on reading the following description, which is given by way of non-limiting example, and by virtue of the appended figures in which.

DETAILED DESCRIPTION

Figure 1:
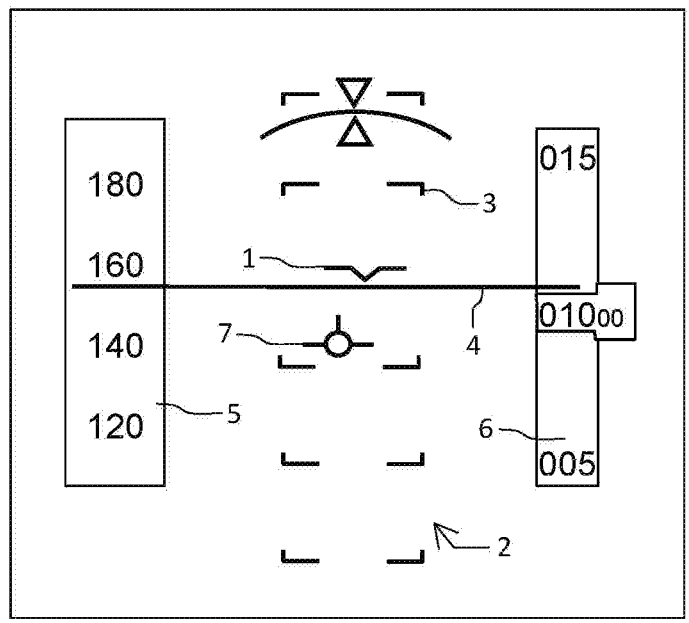
FIG. 1 shows a symbolic representation according to the prior art shown in a viewing system for an aircraft.
Figure 2:
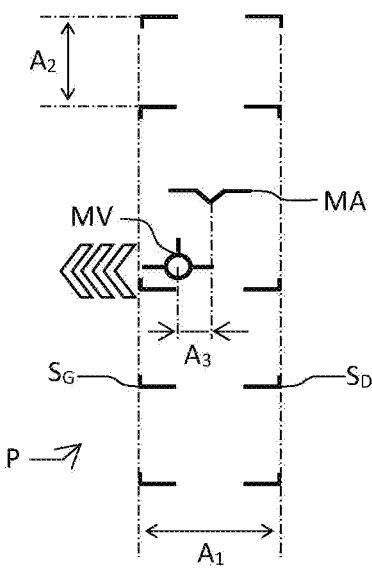
FIGS. 2 to 4 show the various steps representing the implementation of the method according to the invention.

By way of example, FIG. 2 shows an angular pitch scale P including an aircraft icon MA and a speed vector MV under standard conditions, i.e. with a low to moderate crosswind. This symbolic representation is displayed on viewing screens of the instrument panel of an aircraft. The symbols are produced in a conformal position so as to correspond angularly to the pitch and roll angles of the aircraft. In this and the following figures, the movements of the symbols are symbolically represented by white triple chevrons. They do not form part of the displayed symbolic representation.

More specifically, this pitch scale is represented by a first series of first symbols $S_G$ and a second series of second symbols $S_D$. The first series is referred to as the left-hand "set" and the second series is referred to as the right-hand "set" of the scale. The second series is separated from the first series of symbols by a first angular distance $A_1$ in a horizontal direction. The value of this distance is about 10 degrees. Each series or "set" of symbols is composed of identical bracket-shaped symbols. The symbols are vertically aligned. Two successive symbols of one and the same series are separated by an angular distance $A_2$ that is constant in a vertical plane. The value of this distance is about 5 degrees. Two symbols, each belonging to a different set and positioned facing one another, form one of the "bars" of the pitch scale.

This pitch scale includes a third symbol, referred to as the aircraft icon MA, that is representative of the attitude of the aircraft. It is conventionally represented by a winged V, terminating in two identical short bars. Lastly, it includes a fourth symbol, referred to as the speed vector MV, that is representative of the direction of the speed of the aircraft. It is conventionally represented by a circle including two symmetrical horizontal straight segments and a vertical straight bar symbolizing the wings and the drift of the aircraft.

In FIG. 2 and the following figures, the pitch scale is centred on the aircraft icon, which is located at an equal distance from the two bars of the scale. This mode is referred to as heading-up mode. It is possible to make the inverse choice, i.e. to centre the pitch scale on the speed vector. This mode is referred to as track-up mode. All that follows is in heading-up mode but applies in the same way to track-up mode.

When the crosswind is low, the speed vector is close to the aircraft icon. This distance $A_3$ between the two icons does not exceed more than a few degrees. The speed vector remains within the "sets" of the pitch scale. In this case, the angular distance $A_1$ remains constant.

Figure 3:
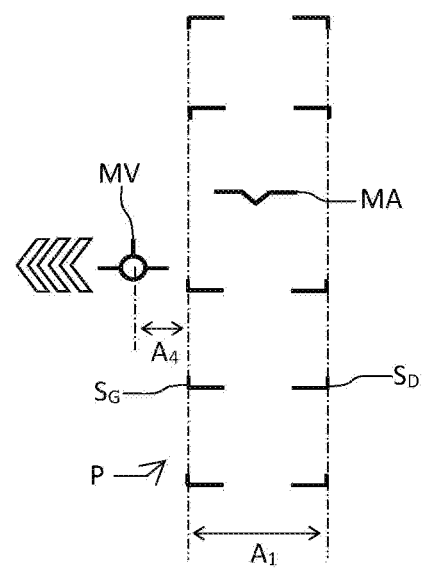

In FIG. 3, the distance between the speed vector and the aircraft icon has increased sufficiently that the speed vector is no longer within but outside the sets of the scale. In the case of FIG. 3, the speed vector has moved to the left. As long as the angular distance $A_4$ in a horizontal plane separating the speed vector from the aircraft icon remains smaller than or equal to a determined value $A_4$, no modification is made to the scale; in other words, as long as the speed vector remains close to one of the sets of the scale, the latter is not modified. In the case of FIG. 3, this is the left-hand set. This proximity is of the order of a few degrees.

Figure 4:
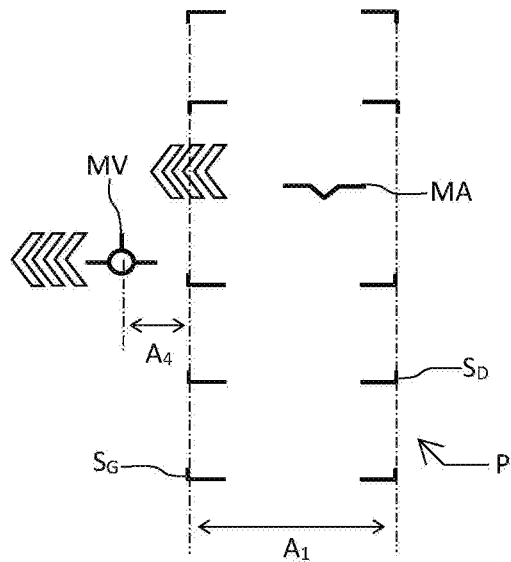

In FIG. 4, the distance between the speed vector MV and the aircraft icon MA has increased further. In this case, so that the angular distance $A_4$ between the left-hand set of the scale and the speed vector remains within reasonable tolerances, the left-hand set of the scale composed of the symbols $S_G$ is moved in order to "track" the speed vector. Thus, the angular position of the speed vector MV with respect to the left-hand set can easily be read. It should be noted that the right-hand set does not move and remains fixed with respect to the aircraft icon. The angular distance $A_1$ separating the two sets of the scale increases.

Figure 5:
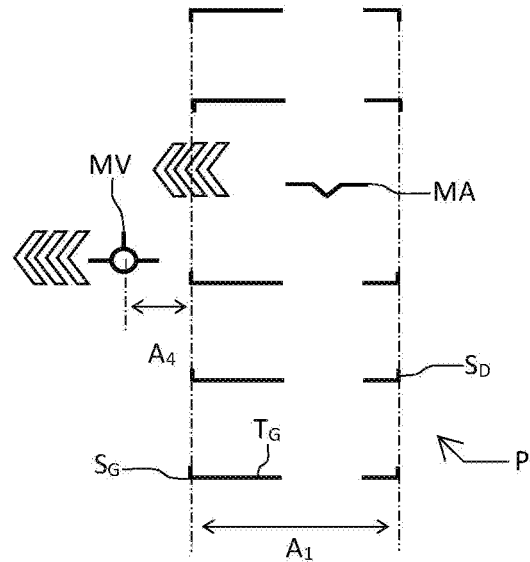
FIG. 5 shows a first variant embodiment of the method according to the invention.
Figure 6:
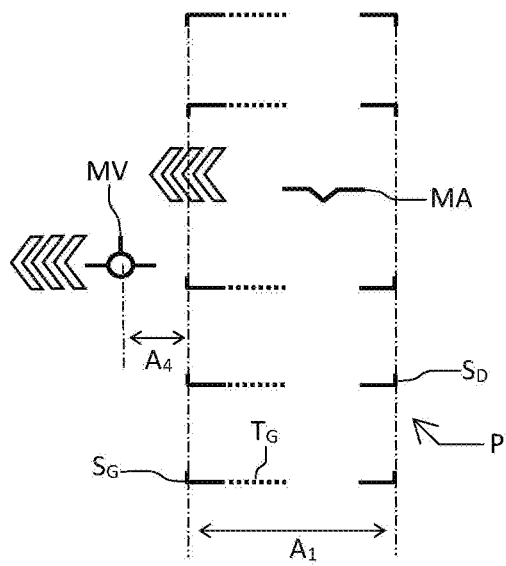
FIG. 6 shows a second variant embodiment of the method according to the invention.

In the case of FIG. 4, the symbols $S_G$ of the left-hand set move without modification. In order to keep the scale easy to read, it is possible to modify the symbols of the set that moves. By way of example, if the first symbols and the second symbols each include a horizontal straight segment, when a first symbol or a second symbol is moved from an initial position to a final position, a horizontal line may link the initial position of the first symbol or of the second symbol to the final position of the first symbol or of the second symbol. This horizontal line $T_G$ may be continuous, as can be seen in FIG. 5, or this line $T_G$ may be discontinuous, as can be seen in FIG. 6. Other modes of representation are possible in order to show that the pitch scale has expanded. In any case, the scale includes a central gap without symbols.

In order to make it easier to read the symbols, the small fluctuations in the angular distance in a horizontal plane separating the speed vector from the aircraft icon are taken into account only when they exceed a determined threshold in a given period of time.

Implementing the method according to the invention does not present any technical problems. It is sufficient to create a simple link between the position of the sets of the pitch scale and the position of the speed vector or of the aircraft icon.

The invention claimed is:

1. A method for graphically managing a pitch scale displayed in an on-board viewing system for an aircraft, said viewing system including a graphics computer carrying out the graphical management and a viewing screen, the method comprising symbolically representing, on said viewing screen, at least:
   an angular pitch scale, said scale being represented by a first series of first symbols and a second series of second symbols that is separated from the first series of symbols by a first angular distance in a horizontal direction;
   a third symbol that is representative of the attitude of the aircraft; and
   a fourth symbol that is representative of a direction of the speed of the aircraft, wherein:
      the first angular distance in the horizontal direction separating the first and the second series of symbols of the pitch scale is a function of an angular distance in the horizontal direction between the third and the fourth symbol,
      the angular pitch scale being centred on the third symbol or the fourth symbol, when the angular distance in a horizontal plane separating the third symbol from the fourth symbol is smaller than or equal to a determined value, the first angular distance separating the first series of symbols from the second series of symbols is constant,
      the angular pitch scale being centred on the third symbol, when the angular distance in a horizontal plane separating the fourth symbol from the third symbol exceeds a determined value, the series of symbols closest to the fourth symbol is moved or modified in a horizontal plane so that the angular distance in a horizontal plane separating the fourth symbol from said moving series remains smaller than a second determined distance, and
      the angular pitch scale being centred on the fourth symbol, when the angular distance in a horizontal plane separating the fourth symbol from the third symbol exceeds a determined value, the series of symbols closest to the third symbol is moved or modified in a horizontal plane so that the angular distance in a horizontal plane separating the third symbol from said moving series remains smaller than said second determined distance.

2. The method for graphically managing a pitch scale according to claim 1, wherein the first symbols are identical to the second symbols regardless of the value of the angular distance separating the fourth symbol from the third symbol.

3. The method for graphically managing a pitch scale according to claim 1, wherein, if the first symbols and the second symbols each include a horizontal straight segment, when a first symbol or a second symbol is moved from an initial position to a final position, a horizontal line links the initial position of the first symbol or of the second symbol to the final position of the first symbol or of the second symbol.

4. The method for graphically managing a pitch scale according to claim 3, wherein the horizontal line is continuous or discontinuous.

5. The method for graphically managing a pitch scale according to claim 1, wherein the first symbols are separated from one another by a third angular distance that is constant in a vertical direction, the second symbols being separated from one another by this same third angular distance that is constant in a vertical direction.

6. The method for graphically managing a pitch scale according to claim 1, wherein, when the angular pitch scale is centred on the third symbol and when the angular distance in a horizontal plane separating the third symbol from the fourth symbol is smaller than or equal to the determined value, the third symbol is at an equal distance in a horizontal plane from the first series of first symbols and from the second series of second symbols.

7. The method for graphically managing a pitch scale according to claim 1, wherein, when the angular pitch scale is centred on the fourth symbol and when the angular distance in a horizontal plane separating the third symbol from the fourth symbol is smaller than or equal to the determined value, the fourth symbol is at an equal distance in a horizontal plane from the first series of first symbols and from the second series of second symbols.

8. The method for graphically managing a symbolic representation according to claim 1, wherein the fluctuations in the angular distance in a horizontal plane separating the fourth symbol from the third symbol are taken into account only when they exceed a determined threshold in a given period of time.

* * * * *